(12) United States Patent
Horie (10) Patent No.: US 11,673,057 B2
(45) Date of Patent: Jun. 13, 2023

(54) GAME DATA TRANSFER BETWEEN DIFFERENT PLATFORMS

(71) Applicant: Gree, Inc., Tokyo (JP)

(72) Inventor: Toshiya Horie, Tokyo (JP)

(73) Assignee: GREE, Inc., Tokyo (JP)

( * ) Notice: Subject to any disclaimer, the term of this patent is extended or adjusted under 35 U.S.C. 154(b) by 983 days.

(21) Appl. No.: 16/354,584

(22) Filed: Mar. 15, 2019

(65) Prior Publication Data

US 2019/0299100 A1   Oct. 3, 2019

(30) Foreign Application Priority Data

Mar. 27, 2018   (JP) .............................. JP2018-059688
Aug. 27, 2018   (JP) .............................. JP2018-158061

(51) Int. Cl.
*H04L 29/06* (2006.01)
*A63F 13/71* (2014.01)
(Continued)

(52) U.S. Cl.
CPC .............. *A63F 13/71* (2014.09); *A63F 13/77* (2014.09); *G06K 7/1417* (2013.01); *H04L 9/3247* (2013.01)

(58) Field of Classification Search
CPC .......... A63F 13/71; A63F 13/77; A63F 13/31; A63F 13/352; A63F 13/655; A63F 13/79;
(Continued)

(56) References Cited

U.S. PATENT DOCUMENTS

2016/0012465 A1*  1/2016  Sharp ................... G06Q 20/321
                                                    705/14.17

FOREIGN PATENT DOCUMENTS

| CN | 104484114 A | 4/2015 |
|---|---|---|
| CN | 105701659 A | 6/2016 |
| JP | 2017-213192 A | 12/2017 |

OTHER PUBLICATIONS

"Information Yugio, Duel Links", [online], Search on Mar. 5, 1990, Internet URL: http://www.konami.com/yugioh/duel_links/en/notice/1/ 5 pgs.
(Continued)

*Primary Examiner* — Beemnet W Dada
*Assistant Examiner* — Leynna Truvan
(74) *Attorney, Agent, or Firm* — Pillsbury Winthrop Shaw Pittman, LLP (57) ABSTRACT

One embodiment of the disclosure relates to a method of transferring game data of a user stored in association with a first user identification information on a first platform to a second platform by executing computer readable instructions by one or more computer processors. The first user identification information is used to identify the user on the first platform and a second user identification information is used to identify the user on the second platform. The method includes a step of generating link data that associates the first user identification information with the second user identification information included in the identification code read by a first client device, and a step of identifying the game data based on the second user identification information and the link data and providing a game to the second client device by using the game data.

16 Claims, 5 Drawing Sheets

(51) Int. Cl.
*G06K 7/14* (2006.01)
*H04L 9/32* (2006.01)
*A63F 13/77* (2014.01)

(58) Field of Classification Search
CPC .......... A63F 2300/55; A63F 2300/5526; A63F 2300/60; H04L 67/306; H04L 9/3247; H04L 67/38; H04L 9/3226; G06K 7/1417; G06Q 30/02
See application file for complete search history.

(56) References Cited

OTHER PUBLICATIONS

First Office Action dated Jul. 20, 2022, issued in corresponding Chinese Patent Application No. 201910210666.2 with English translation (18 pgs.).
Second Office Action dated Nov. 15, 2022, issued in corresponding Chinese Application No. 201910210666.2 with English translation (18 pgs.).

* cited by examiner

Fig. 1

| Account Information | Determination Info. | Transfer Status Information |
|---|---|---|
| Second User ID | Nonce | Flag Information |

Fig. 2

| Account Information | Game Data |
|---|---|
| First User ID | Acquired Items, Progress, etc. |

Fig. 3

| Second Account Information | Game Data |
|---|---|
| Second User ID | Acquired Items, Progress, etc. |

Fig. 4

| Original Account Information | Transfer-Destination Account Info. |
|---|---|
| First User ID | Second User ID |

GAME DATA TRANSFER BETWEEN DIFFERENT PLATFORMS

CROSS-REFERENCE TO RELATED APPLICATIONS

This application is based on and claims the benefit of priority from Japanese Patent Application Serial No. 2018-059688 (filed on Mar. 27, 2018), Japanese Patent Application Serial No. 2018-158061 (filed on Aug. 27, 2018), the contents of which are hereby incorporated by reference in its entirety.

TECHNICAL FIELD

The present disclosure relates to game data transfer between different platforms.

BACKGROUND

Games of the same title may be provided on different platforms. For example, games of the same title may be provided in both a smartphone version and a personal computer (PC) version. Smartphone version games are provided on a smartphone platform and PC version games are provided on a PC platform.

When a game progresses, game data is accumulated for each user. However, game data accumulated through game plays on one platform cannot be used on other platforms. For example, game data accumulated through game plays on the smartphone platform cannot be used in a game play performed on the PC platform.

It is desired that a player is able to continue to play the same game on a platform different from the platform being used. For example, when a user replaces an electronic device used for playing games, when a user wishes to play the game he/she played on a PC with a smartphone, when a user wishes to play the game he/she played on a smartphone with a PC, and so on, it is desired that such users are allowed to play games on a new platform rather than the platform in use.

In order to meet such needs, it is necessary to transfer game data accumulated on the platform currently used to a platform that is going to be newly used. In a conventional method for transfer of game data, an original platform firstly issues a transfer code for transferring the game data, and a transfer destination platform receives the transfer code which the user enters.

Typically, the transfer code is a numeric string of approximately 5 to 10 digits. Non-patent document "Information Yugio, Duel Links," [online], Search on Mar. 5, 1990, Internet (URL: https://www.konami.com/yugioh/duel_links/en/notice/1/) describes a transfer method of game data using a transfer code issued by an original platform.

Another example of the conventional method for transfer of game data is disclosed in Japanese Patent Application Publication No. 2017-213192 ("the '192 Publication"). The '192 Publication discloses a method for game data transfer from another gaming device linked to the same account as the own device by using data managed by an access point of a wireless LAN.

Game data transfer has been available only when the original platform and the transfer-destination platform use a unified user account. There has been no method for transfer game data between two different platforms where user accounts are not unified.

It is desired that the transfer of game data between different platforms are made possible even when different user accounts are used between the original platform and the destination platform.

SUMMARY

It is an object of the present disclosure to provide a technical improvement which solves or alleviates at least part of the drawbacks of the prior art mentioned above. Specifically, one object of the disclosure is to enable transfer of game data between two platforms in which different user accounts are used.

One aspect of the disclosure relates to a method of transferring game data of a user stored in association with a first user identification information on a first platform to a second platform by executing computer readable instructions by one or more computer processors. The first user identification information is used to identify the user on the first platform and a second user identification information is used to identify the user on the second platform. The method includes a step of encoding identification data including the second user identification information to generate an identification code, a step of outputting the identification code to a second client device that uses the second platform, a step of reading the identification code by a first client device that uses the first platform; a step of generating link data that associates the first user identification information with the second user identification information included in the identification code read by a first client device, and a step of identifying the game data based on the second user identification information and the link data and providing a game to the second client device by using the game data.

In the method, the identification code may be an optically readable code.

In the method, the identification code may be displayed on a display of the second client device in the step of outputting.

The method may further include a step of transmitting a notification of completion to the second platform in response to the association of the first user identification information with the second user identification information included in the identification code.

The method may further include a step of initiating the game on the second client device in response to reception of the notification of completion by the second platform.

In the method, the notification of completion may be generated to include the nonce included in the identification code received from the first client device.

In the method, an electronic signature may be attached to the identification data, and the first user identification information may be associated with the second user identification information included in the identification code when it is determined by using a public key that the identification data is valid.

In the method, the identification code may further include expiration information indicating when the identification code expires, and the first user identification information may be associated with the second user identification information included in the identification code when the identification code is unexpired.

In the method, the identification code may further include expiration information indicating when the identification code expires, and the first user identification information may be associated with the second user identification information included in the identification code when the identification code is unexpired.

Another aspect of the disclosure relates to a computer-readable tangible non-transitory storage medium comprising a program for transferring game data of a user stored on a first platform in association with a first user identification information to a second platform, the first user identification information being used to identify the user on the first platform, the second user identification information being used to identify the user on the second platform. The program includes executable instructions that, when executed, cause one or more computer processors to perform: a step of generating an identification code including the second user identification information, a step of outputting the identification code to a second client device that uses the second platform, a step of reading the identification code by a first client device that uses the first platform, a step of associating the first user identification information with the second user identification information included in the identification code read by a first client device, and a step of providing a game to the second client device by using the game data.

Yet another aspect of the disclosure relates to a system for transferring game data of a user on a first platform where first user identification information is used to identify the user to a second platform where second user identification information is used to identify the user. The system includes one or more processors and a storage storing game data of the user on the first platform in association with the first user identification information. The one or more processors execute computer readable instructions to encode identification data including the second user identification information to generate an identification code, cause a second client device that uses the second platform to output the identification cord, cause a first client device that uses the first platform to read the identification code, generate link data that associates the first user identification information with the second user identification information included in the identification code read by the first client device, and identify the game data based on the second user identification information and the link data and provide a game to the second client device by using the game data.

According to the aspects, it is possible to enable transfer of game data between two platforms in which different user accounts are used.

DESCRIPTION OF THE EMBODIMENTS

Various embodiments of the disclosure will be described hereinafter with reference to the accompanying drawings. Throughout the drawings, the same or similar components are denoted by the same reference numerals.

Figure 1:
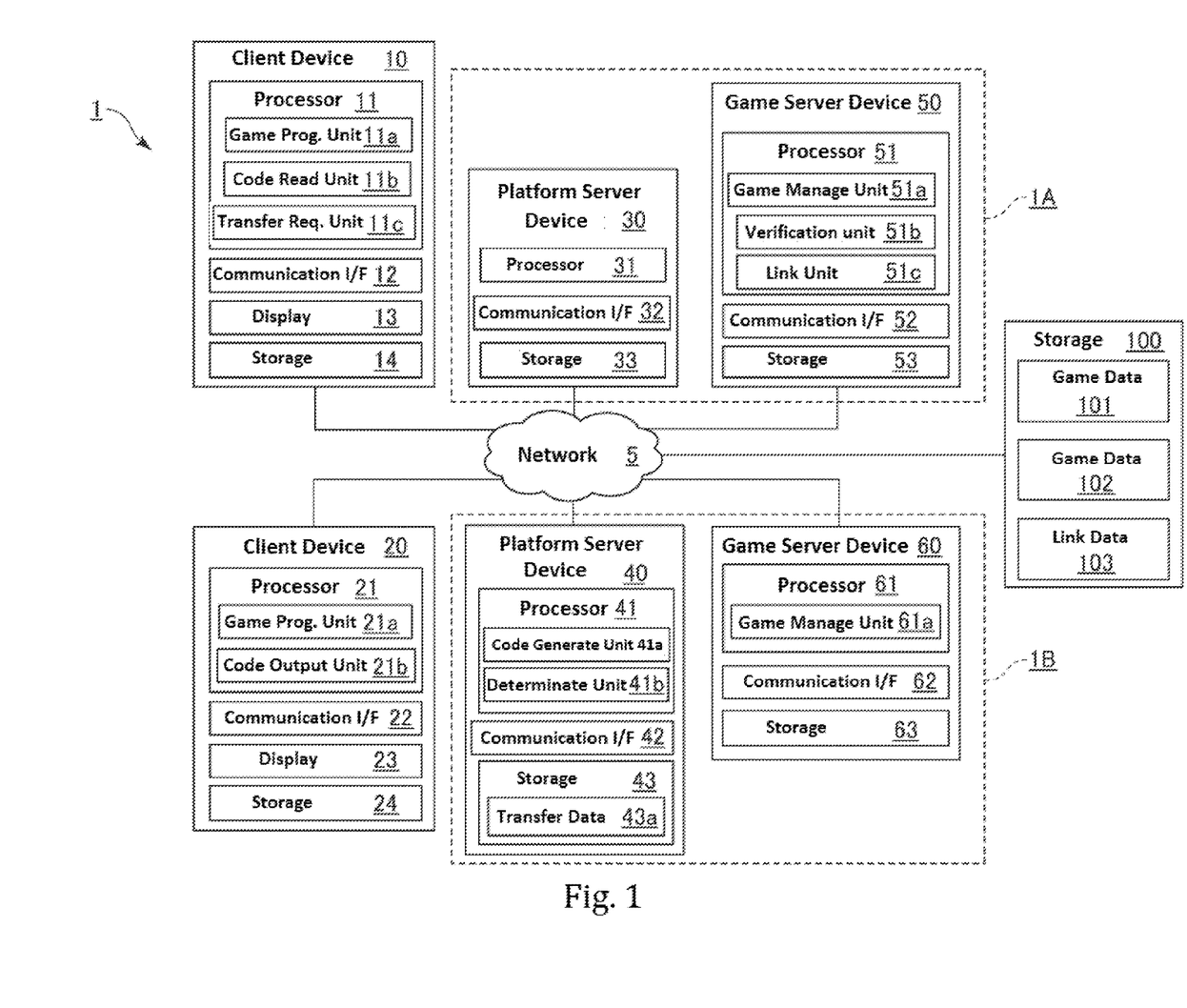
FIG. 1 is a block diagram illustrating a game processing system according to one embodiment.

A game processing system 1 according to one embodiment will be described with reference to FIGS. 1 to 5. FIG. 1 is a block diagram of the game processing system 1 according to one embodiment, and FIGS. 2 to 5 are diagrams for describing information stored in the game processing system 1 of FIG. 1.

Referring to FIG. 1, the game processing system 1 according to one embodiment of the disclosure includes a platform 1A, a client device 10 that uses the platform 1A, a platform 1B, a client device 20 that uses the platform 1B, and a storage 100. The client device 10 is an example of a first client device, and the client device 20 is an example of a second client device. In the specification, it is assumed that the client device 10 and the client device 20 are used by the same user A.

The platform 1A includes a platform server device 30 and a game server device 50. The platform 1A is an example of a first platform. The platform 1B includes a platform server device 40 and a game server device 60. The platform 1B is an example of a second platform.

The client device 10, the client device 20, the platform server device 30, the platform server device 40, the game server device 50, the game server device 60, and the storage 100 are communicably interconnected over the network 5. The network 5 may be a single network or may be a plurality of networks connected to each other. The network 5 is, for example, the Internet, a mobile communication network, or a combination thereof. Any network enabling communication between electronic devices can be used as the network 5.

In the illustrated embodiment, the client device 10 is a smartphone and the client device 20 is a personal computer (PC). Other than a smartphone, the client device 10 may be a mobile phone, a tablet, a personal computer, an electronic book reader, a wearable computer, a gaming console, a head mounted display, and any other information processing devices. Similarly, other than the PC, the client device 20 may be a smart phone, a mobile phone, a tablet, an electronic book reader, a wearable computer, a gaming console, a head mounted display, and any other information processing devices. In the following description, for the sake of simplicity of explanation, an exemplary embodiment in which the client device 10 is a smartphone and the client device 20 is a PC will be described.

The platform server device 30 is a server device for providing a first platform service to client devices and the platform server device 40 is a server device for providing a second platform service to client devices. The first platform service provided by the platform server device 30 and the second platform service provided by the platform server device 40 are, for example, a game platform service, a download service of application software, a payment service, a video contents distribution service, a communication service for interacting with other users, and any other network services. When the platform server device 30 provides the game platform service, the platform server device 30 holds link information to a plurality of games, and may provide the link information to the client device 10 that accesses the platform server device 30. A user operates the client device 10 to select the link information of a desired game in order to start playing the game.

The platform server device 30 and the platform server device 40 may be configured to provide platform services for particular types of client devices or particular types of client applications. For example, the platform server device 30 and the platform server device 40 may provide the first platform service to a target client device selected from the group consisting of a smartphone, a tablet, a PC, a prescribed game console, and any other prescribed client device, and not provide the first platform service to a client device other than the target client device. In another example, the platform server device 30 and the platform server device 40 may provide the first platform service to a target client device that has a prescribed operating environment (eg, iOS™, Android™, Windows™, Mac OS™, or any other predetermined operating system or application software), and may not provide the first platform service to a client device (a client device other than the target client device) that does not have the prescribed operating environment.

In the illustrated embodiment, the client device 10 is a smartphone so that the platform server device 30 is a platform server device for smartphones configured to provide the first platform service to the smartphones. The client device 20 is a PC so that the platform server device 40 is a platform server device for PCs configured to provide the second platform service to the PCs. In this case, even if the platform server device 30 receives an account registration request from a device (for example, a PC) other than the smartphone, the platform server device 30 does not provide the platform service in response to the request. A user who wishes to receive the first platform service from the platform server device 30 accesses the platform server device 30 via a smartphone. Likewise, even if the platform server device 40 receives an account registration request from a device (for example, a smartphone) other than a PC which is the service target device, the platform server device 40 does not provide the platform service in response to the request. A user who wishes to receive the second platform service from the platform server device 40 accesses the platform server device 40 via a PC.

The user who wishes to receive the first platform service from the platform server device 30 performs account registration to the first platform service. The user can receive the first platform service from the platform server device 30 once he/she completed the account registration of the first platform service. For the account registration, the user provides predetermined user information (for example, user name, mail address, and age) to the platform server device 30 via the client device 10. When the account registration for using the first platform service is completed, user identification information for identifying the user in the first platform service is assigned to the user. In the specification, the user identification information assigned to a user who receives the first platform service may be referred to as first user identification information or a first user ID.

The user who wishes to receive the second platform service from the platform server device 40 performs account registration to the second platform service. The user can receive the second platform service from the platform server device 40 once he/she completed the account registration of the second platform service. For the account registration, the user provides predetermined user information (for example, user name, mail address, and age) to the platform server device 40 via the client device 20. When the account registration for using the second platform service is completed, user identification information for identifying the user in the second platform service is assigned to the user. In the specification, the user identification information assigned to a user who receives the second platform service may be referred to as second user identification information or a second user ID.

A user to whom the first user ID has been assigned is able to receive the provision of the first platform service by accessing and logging in to the platform server device 30 via the client device 10 using the first user ID and a password. Similarly, a user to whom the second user ID has been assigned is able to receive the provision of the second platform service by accessing and logging in to the platform server device 40 via the client device 20 using the second user ID and a password.

Only single client device 10 is shown in FIG. 1, however any number of the client devices 10 may be included in the platform 1. Similarly, any number of the client devices 20 may be included in the platform 2. In other words, the platform 1 may include more than one client device 10, and each of the client devices 10 is capable of receiving the provision of the first platform service from the platform server device 30. Similarly, the platform 2 may include more than one client device 20, and each of the client devices 20 is capable of receiving the provision of the second platform service from the platform server device 40.

The game server device 50 is configured to provide an online game service to the client device 10. After logging in using the first user ID, the client device 10 can receive the online game service from the game server device 50. For example, the game server device 50 processes a game message (e.g., a message related to operations of a player character or a message indicating that the player wishes to start a quest) received from the client device 10 in accordance with a predetermined game logic (or a program for implementing the game logic), and transmits the processing result to the client device 10. Similarly, the game server device 60 is configured to provide an online game service to the client device 20. After logging in using the second user ID, the client device 20 can receive the online game service from the game server device 60. The game provided by the game server device 50 and the game provided by the game server device 60 may be a smartphone version and a PC version of the same title game respectively. The function of the game server device 50 and the function of the game server device 60 may be provided by a single game server device respectively.

The game server device 50 and the game server device 60 realize various games. In the games provided by the game server device 50 and the game server device 60, game contents may be used. Game contents are electronic data that are used in a game and can be acquired, owned, used, managed, exchanged, integrated, reinforced, sold, abandoned, or donated in the game by users. The game contents may be, for example, a card, an item, a virtual currency, a ticket, a character, an avatar, level information, status information, parameter information (health, attack, and the like), and statics information, skills, abilities, magic and jobs, and any other various electronic data usable in the game. However, the game contents usable in the game processing system 1 and how the game contents are used may not be limited to those described in this specification.

The client device 10 includes a processor 11, a communication I/F 12, a display 13, and a storage 14. The client device 20 includes a processor 21, a communication I/F 22, a display 23, and a storage 24.

The platform server device 30 includes a processor 31, a communication I/F 31, and a storage 33. The platform server device 40 includes a processor 41, a communication I/F 42, and a storage 43.

The game server device 50 includes a processor 51, a communication I/F 52, and a storage 53. The game server device 60 includes a processor 61, a communication I/F 62, and a storage 63.

The processor 11, 21, 31, 41, 51, 61 is an operating device that loads an operating system and various programs into a memory unit and may execute commands included in the loaded programs. The computer processor 11, 21, 31, 41, 51, 61 is, for example, a CPU, an MPU, a DSP, a GPU, any other computing device, or a combination thereof. The processor 11 may be realized by means of an integrated circuit such as ASIC, PLD, FPGA, MCU, or the like.

The communication I/F 12, 22, 32, 42, 52, 62 may be implemented as hardware, firmware, or communication software such as a TCP/IP driver or a PPP driver, or a combination thereof. The client device 10, the client device 20, the platform server device 30, the platform server device 40, the game server device 50, and the game server device 60 are capable of transmitting and receiving to/from other devices via the communication I/F 12, 22, 32, 42, 52, 62.

The display 13, 23 may be a liquid crystal display, an organic EL display, or any other information display device capable of displaying images. The display 13, 23 may have a touch-screen panel capable of detecting a touch operation (contact operation) of the player.

The storage 14, 24, 34, 44, 54, 64 is, for example, a magnetic disk, an optical disk, a semiconductor memory, or various other storage device capable of storing data.

Various programs such as a game processing program and the like are stored in the storage 14, 24. The storage 14, 24 may also store various data used in a game(s).

Information necessary for providing the first platform service is stored in the storage 33, and information necessary for providing the second platform service is stored in the storage 43. For example, account information of users who register his/her account, video data to be distributed to registered users, payment information necessary for registered users to make a settlement (for example, information on credit cards of the users), and any other information necessary for providing the first platform service are stored. The information necessary for providing the second platform service is similar to the information necessary for providing the first platform service.

Figure 2:
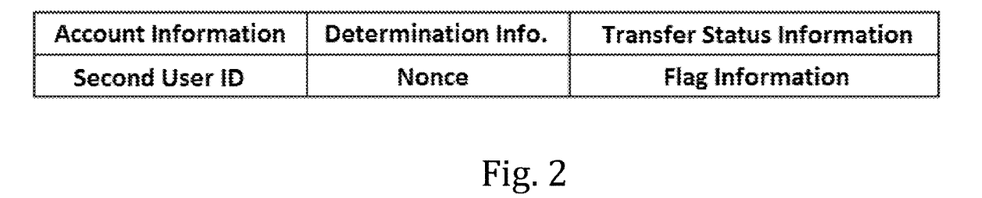
FIG. 2 illustrates information stored in the game processing system of FIG. 1.

Furthermore, transferal data 43a related to the process of transferring game data to the platform 1B from another platform is stored in the storage 43. An example of the transferal data 43a is shown in FIG. 2. As shown in FIG. 2, the transferal data 43a may include account information on the platform 1B of a user A who performs game data transfer, determination information for determining whether a link notification (which will be described later) is valid, transfer status information indicating whether game data transfer to the platform 1B has been completed, and any other information. As described above, the storage 43 may store the determination information, the transfer status information, and any other information in association with the account information of the user requesting transfer of the game data. The account information is, for example, user identification information (second user ID) of the user on the platform 1B. The determination information is, for example, a nonce to prevent a replay attack. The transfer status information is, for example, binary flag information. For example, the flag information indicates that game data transfer process has been completed when the value is "1", and indicates that the game data transfer process has not been completed when the value is "0".

The storage 53 may store a program(s) for executing game logic, asset data, and any other data necessary for providing a game(s). The storage 63 may store a program(s) for executing game logic, asset data, and any other data necessary for providing a game(s).

The storage 100 stores game data 101 used in a game provided by the game server device 50 of the platform 1A, game data 102 used in a game provided by the game server device 60 of the platform 1B, and link data 103.

Figure 3:
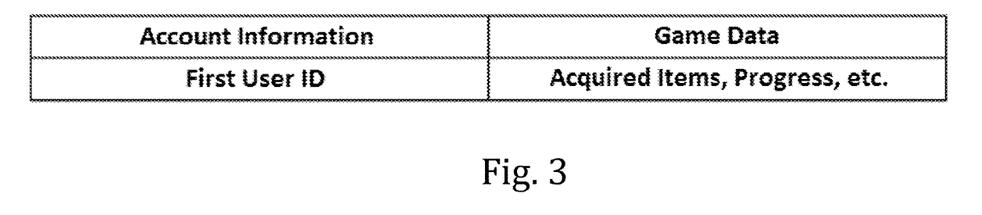
FIG. 3 illustrates information stored in the game processing system of FIG. 1.

An example of the game data 101 is shown in FIG. 3. As shown in FIG. 3, the game data 101 of the user A is stored in the storage 100 in association with the account information of the user A on the platform 1A (for example, the first user ID of the user A). The game data 101 may be accessible to the game server 50 so that the game server 50 is able to write and retrieve the data.

Figure 4:
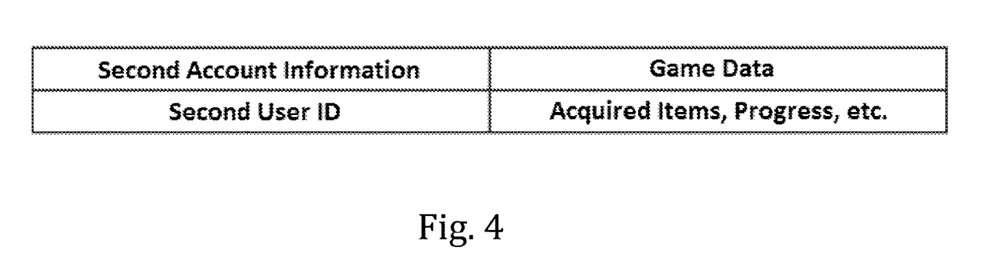
FIG. 4 illustrates information stored in the game processing system of FIG. 1.

An example of the game data 102 is shown in FIG. 4. As shown in FIG. 3, the game data 102 of the user A is stored in the storage 100 in association with the account information of the user A on the platform 1B (for example, the second user ID of the user A). The game data 102 may be accessible to the game server 60 so that the game server 60 is able to write and retrieve the data.

The game data 101 may include data indicating a game item that the user A acquired in a game provided by the game server device 50, data indicating points and virtual currency that the user A acquired in the game, data indicating quests completed in the game, and any other data used for managing the progress of the game. Similarly, the game data 102 may include data indicating a game item that the user A acquired in a game provided by the game server device 60, data indicating points and virtual currency that the user A acquired in the game, data indicating quests completed in the game, and any other data used for managing the progress of the game. The game data stored in the storage 100 may be accessed from a game server device that provides a game in which the game data is used but may be made inaccessible from other devices. For example, the game data 101 may be accessible from the game server device 50 but made inaccessible from other devices. The game data 102 may be accessible from the game server device 60 but made inaccessible from other devices.

At least a portion of the game data 101 stored in the storage 100 may be stored in the storage 53 of the game server device 50 instead. Similarly, at least a portion of the game data 102 stored in the storage 100 may be stored in the storage 63 of the game server device 60 instead.

Figure 5:
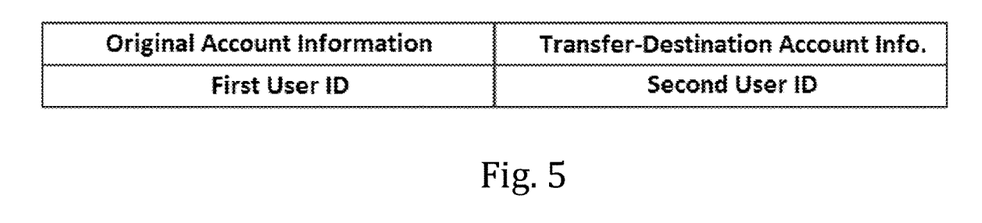
FIG. 5 illustrates information stored in the game processing system of FIG. 1.

An example of the game data 103 is shown in FIG. 5. As shown in FIG. 5, the link data 103 includes information of an original account on the original platform and information of a transfer-destination account on the transfer destination platform. In the link data 103, the original account information is associated with the information of the transfer-destination account. FIG. 5 shows the example of the link data 103 in the embodiment where the game data is transferred from the platform 1A to the platform 1B. The original account information in FIG. 5 is the user identification information (the first user ID) of the user A on the original platform 1A, and the information of the transfer-destination account is the user identification information (second user ID) of the user A on the transfer destination platform 1B.

Next, functions of devices included in the game processing system 1 will be described respectively. Functions of the platform server device 30 and the platform server device 40 will be firstly described. The processor 31 of the platform server device 30 is configured to perform various functions (a payment function and the like) related to the first platform service by executing computer readable instructions. Similarly, the processor 41 of the platform server device 40 is configured to perform various functions (a payment function and the like) related to the first platform service by executing computer readable instructions.

The processor 41 of the platform server device 40 is configured to further function as a code generation unit 41*a* and a determination unit 41*b* by executing computer readable instructions.

In one embodiment, the code generation unit 41*a* generates an identification code in response to a request (identification code request) from the client device 20 and transmits the generated identification code to the client device 20. The identification code is generated by encoding the identification data with a predetermined encoding system. The identification data includes the user identification information (the second user ID) on the platform 1B of the user A who uses the client device 20 that has transmitted the identification code request. The identification code may be, for example, an optically readable code. The identification code may be a QR Code™. As is well known, the QR code is a matrix two-dimensional code. An embodiment where a QR code is used as the identification code will mainly be hereunder described. However, the QR code is merely an example of the identification code, and various optically readable codes and any other codes can be used as the identification code applicable to the invention.

In addition to the user identification information (the second user ID) on the platform 1B of the user A who requested issuance of the identification code, the identification data to be encoded by the code generation unit 41*a* may include at least one selected from the group consisting of the name of an issuer of the identification code (for example, the name of the server device 40), an expiration date and/or time of the identification code, a parameter for countermeasures against replay attacks (for example, a nonce), and any other information.

In one embodiment, the code generation unit 41*a* generates a token with an electronic signature by signing the identification data with a secret key, and encodes the generated token to generate an QR code. The token may be, for example, a token of JWT (JSON Web Token) format.

The determination unit 41*b* determines whether a linking process for transferring game data to the platform 1B has been completed, based on a link notification, which will be described later. When it is determined that the transfer process has been completed, the determination unit 41*b* updates the transfer status information of the transfer data 43*a*. When the transfer status information is binary flag information, in response to the completion of the transfer process, the value of the flag information is set to "1" indicating that the game data transfer process has been completed.

Functions of the client device 10 and the client device 20 will be now described. In the illustrated embodiment, the processor 11 of the client device 10 serves as a game progressing unit 11*a*, a code reading unit 11*b*, and a transfer request unit 11*c* by executing computer readable instructions. The processor 21 of the client device 20 serves as a game progressing unit 21*a* and a code output unit 21*b* by executing computer readable instructions.

The game progressing unit 11*a* progresses the game in accordance with operation input by a user via an input mechanism (for example, a touch-screen panel) of the client device 10. Similarly to the game progressing unit 11*a*, the game progressing unit 21*a* progresses the game in accordance with operation input by the user. The operation input by the user is, for example, an input for designating an action of the player character.

The code output unit 21*b* of the client device 20 displays a QR code received from the platform server device 40 on the display 23.

The code reading unit 11*b* of the client device 10 reads the QR code displayed on the display 23 of the client device 20. The code reading unit 11*b* scans the QR code displayed on the display 23 of the client device 20 using a camera provided in the client device 10. The code reading unit 11*b* decodes the read QR code to obtain identification data.

The transfer request unit 11*c* transmits, to the game server device 50, a transfer request for linking the game data between the platforms. The transfer request is transmitted to the game server device 50 together with the identification data obtained by the code reading unit 11*b*. The transfer request may be transmitted to the game server device 50 together with the user identification information (the first user ID) of the user who uses the client device 10 on the platform 1A.

Next, functions of the game server device 50 and the game server device 60 will be described. The processor 51 of the game server device 50 serves as a game management unit 51*a*, a verification unit 51*b*, and a link unit 51*c* by executing computer readable instructions. The processor 61 of the game server device 60 serves as a game management unit 61*a* by executing computer readable instructions.

The game management unit 51*a* and the game management unit 61*a* perform various processes for progressing the game. The game management unit 51*a* may process a game message from the client device 10 in accordance with predetermined game logic and provide various game data for executing a battle game to the client device 10, thereby to control the progress of the game. For example, when the game management unit 51*a* receives a message instructing to use an item from the client device 10, the game management unit 51*a* performs a process for using the instructed item. The game management unit 61*a* may perform the similar processing as the game management unit 51*a*.

The verification unit 51*b* verifies the identification data received from the client device 10 in accordance with a predetermined verification algorithm. For example, when the identification data is signed with a secret key, the validity of the identification data is checked using a public key corresponding to the secret key in accordance with the predetermined verification algorithm. In this way, the verification unit 51*b* can determine whether the identification data received from the client device 10 is validly signed by the platform server device 40. In a case where the issuer name of the identification code is included in the identification data, the verification unit 51*b* may determine whether the issuer is a valid issuer based on the name.

In one embodiment, the link unit 51*c* is configured to perform the linking process for transferring the game data of the user A accumulated in the game provided on the platform 1A (that is, a game provided by the game server device 50) to the platform 1B when it is determined that the identification data is validly signed by the platform server device 40. The linking processing is performed by generating link data 103 and storing the generated link data 103 in the storage 100. More specifically, the link unit 51*c* associates the user identification information (the second user ID) of the user A on the platform 1B included in the identification data received from the client device 10 with the user identification information (the first user ID) of the user A on the platform 1A and stores them in the storage 100 as the link data 103. The link data 103 may be stored in a storage other than the storage 100. For example, the link data 103 may be stored in any one of the storage 43, the storage 53, the storage 63, and any other storage, and may be distributedly stored in these storages.

In the case where the issuer name of the identification code is included in the identification data, the verification unit 51b may perform the linking process. In a case where the identification data includes an expiration date and/or time of the identification code, the verification unit 51b may perform the linking process when it is determined that it is before the expiration date and/or time.

Figure 6:
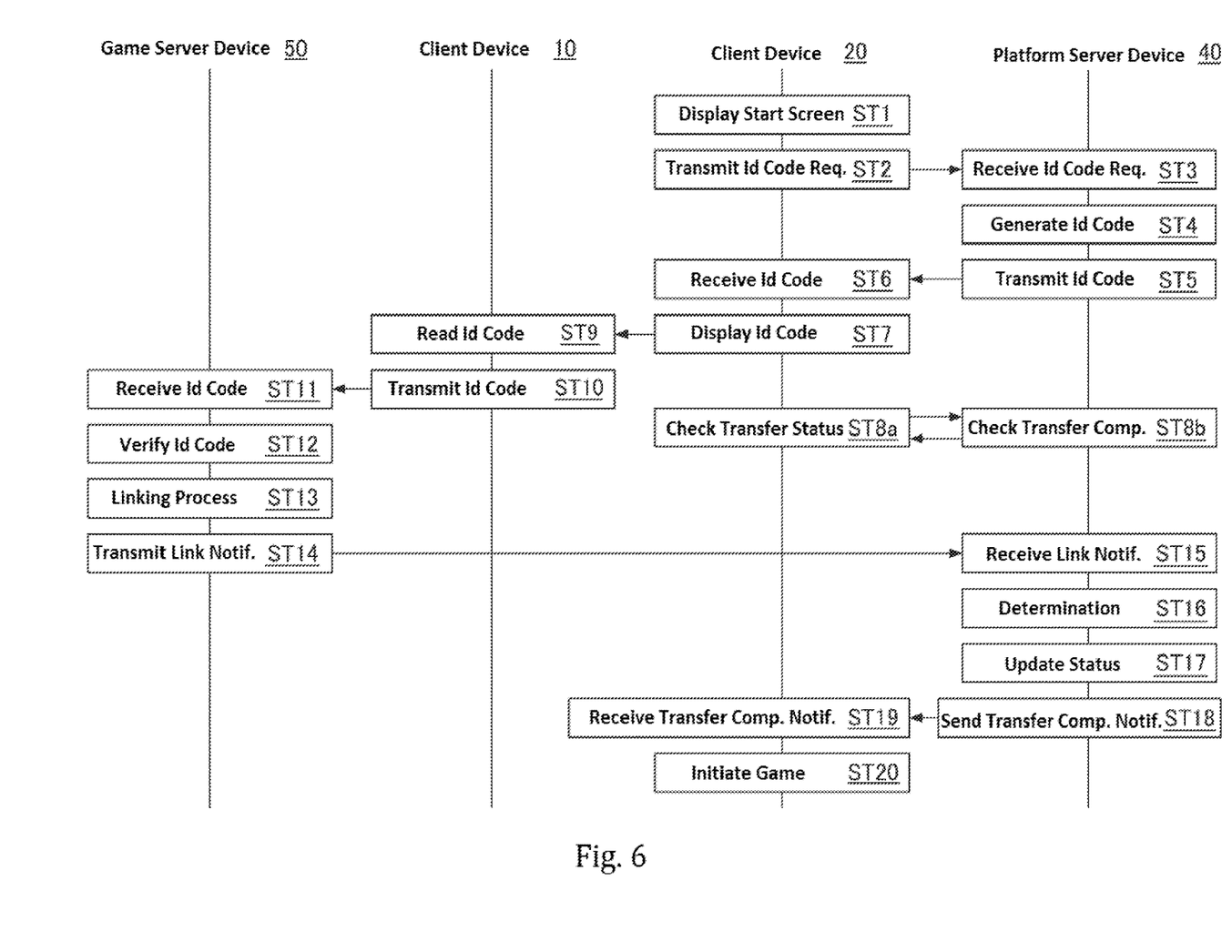
FIG. 6 is a sequence diagram for describing a process performed in the game processing system according to one embodiment.
Figure 7:
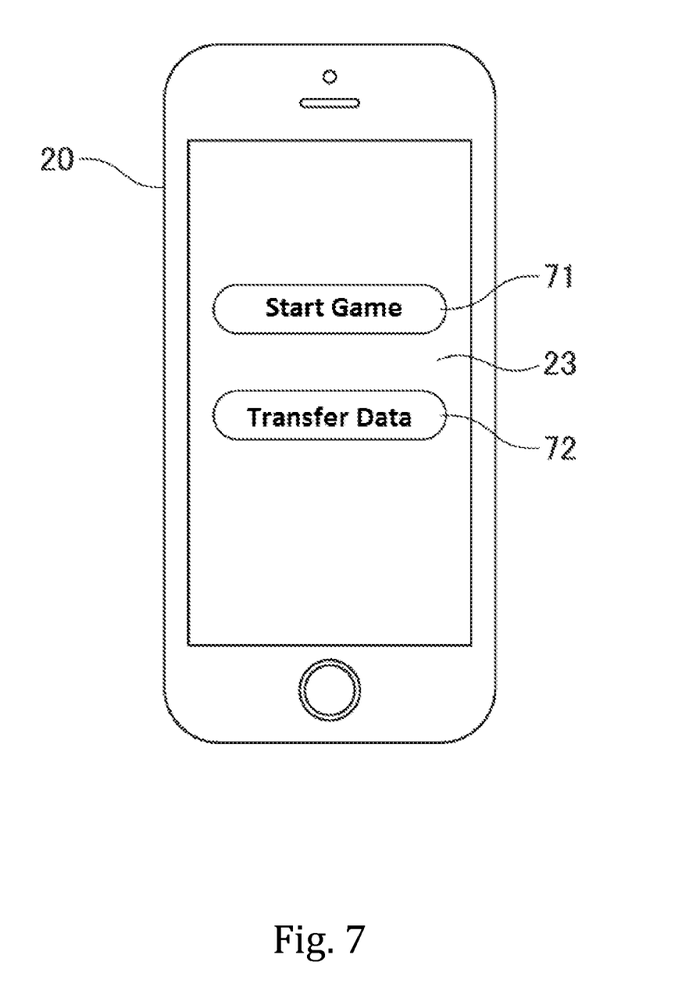
FIG. 7 schematically illustrates an example of a display image displayed on a client device included in the game processing system according to one embodiment.
Figure 8:
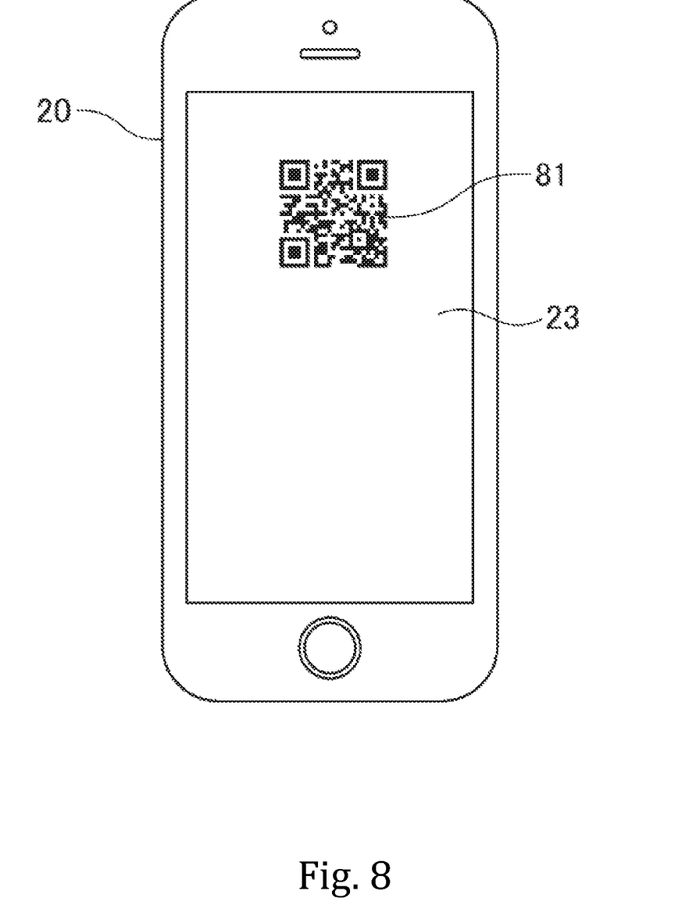
FIG. 8 schematically illustrates an example of an identification code displayed on the client device included in the game processing system according to one embodiment.

The transfer process for transferring the game data from the platform 1A to the platform 1B will be now described with reference to FIGS. 6 to 8. FIG. 6 is a sequence diagram for describing a process performed in the game processing system according to one embodiment, FIG. 7 schematically illustrates an example of a display image displayed on the client device 20, and FIG. 8 schematically illustrates an example of the identification code displayed on the client device 20.

At the start of the transfer process shown in FIG. 6, it is assumed that the user A logs in to the platform 1A and accesses the game server device 50 via the client device 10 to play the game on the platform 1A and consequently the game data 101 of the user A is stored in the storage 100 in association with the first user ID of the user A. It is further assumed that the user A is going to transfer the game data accumulated in the platform 1A to the platform 1B. In the example illustrated in FIG. 6, the platform 1A is the original platform and the platform 1B is the transfer destination platform.

In the game data transfer process, a game start screen is firstly displayed on the display 23 of the client device 20 in step ST1. FIG. 7 schematically shows an example of the start screen displayed on the client device 20. As shown in FIG. 7, the start screen displayed on the client device 20 includes a game start button 71 for starting the game without performing the data transfer process and a data transfer button 72 for starting the transfer process of the game data. When the game start button 71 is selected by the user A, a process for progressing the game in accordance with the game program and operation input by the user is executed. When the game is progressed, the client device 20 accesses the game server device 60 as necessary. The process of progressing the game on the client device 20 is executed by, for example, the game progressing unit 21a and the game management unit 61a.

When the data transfer button 72 is selected by the user A, the transfer process proceeds to step ST2. In step ST2, the identification code request is transmitted from the client device 20 to the platform server device 40.

The identification code request transmitted from the client device 20 is received by the platform server device 40 in step ST3. In step ST4, in response to the received identification code request, the platform server device 40 subsequently encodes the identification data including the second user ID, which is the user identification information of the user A on the platform 1B, to generate the identification code. In addition to the second user ID of the user A, the identification data may include a nonce. The identification data may be signed with a secret key. Generation of the identification code is performed, for example, by the code generation unit 41a.

Concurrently with the generation of the identification code, or before/after the generation of the identification code, part or all of the identification data is stored in the storage 43 in the form of the transfer data 43a. The game data transfer process has not been completed at the time of the process in step ST4, so that the value of the transfer status information of the transfer data 43a is set to "0".

The generated identification code is transmitted to the client device 20 in step ST5, and the client device 20 receives the identification code in step ST6. The received identification code is displayed on the display 23 of the client device 20 in step ST7. In step ST7, an image 81 of the QR code is displayed in a predetermined area of the display 23 as shown in FIG. 8.

The client device 20 periodically transmits a request to check the transfer status to the platform server device 40 in step ST8a. In response to this, in step ST8b, the transfer data 43a is checked, and when the value of the transfer status information associated with the second user ID of the user A is "0", it is determined that the transfer of the game data has not been completed yet and the server device returns a notification indicating that fact to the client device 20. The request to check the transfer status may be periodically transmitted from the client device 20 until the value of the transfer status information is turned to "1".

The client device 10 reads the QR code displayed on the client device 20 in step ST9. The read QR code is decoded to obtain the identification data. The reading and decoding of the QR code are carried out, for example, by the code reading unit 11b.

The identification data obtained by decoding the QR code is transmitted to the game server device 50 in step ST10. This identification data is received by the game server device 50 in step ST11.

The validity of the received identification data is checked in step ST12. For example, when an electronic signature is attached to the identification data, it is verified whether the signature is created by an authorized signer by using the public key corresponding to the secret key. The verification of the identification data is performed, for example, by the verification unit 51b.

When it is determined in step ST12 that the identification data is invalid, the game data transfer process is terminated without proceeding to the next step. In this case, the transfer process is terminated without transferring the game data from the platform 1A to the platform 1B.

Whereas it is determined that the identification data is valid, the transfer process proceeds to step ST13 and the linking process for transferring the game data of the user A to the platform 1B is performed Specifically, the user identification information (the first user ID) of the user A on the platform 1A included in the identification data whose validity is confirmed is associated with the user identification information (the second user ID) of the user A on the platform 1B and stored in the storage 100 as the link data 103. The linking process is carried out, for example, by the above-mentioned link unit 51c.

Upon completion of the linking process in step ST13, the process proceeds to step ST14, and the link notification indicating that the link process is completed is transmitted from the game server device 50 to the platform server device 40. The link notification may include the nonce included in the identification data used for generating the link data 103.

The processes in steps ST9 and ST10 performed by the client device 10 and the processes in step ST11 to step ST14 performed by the game server device 50 may be executed in parallel with the process in step ST8a performed by the client device 20 and the process in step ST8b performed by the platform server device 40.

The link notification transmitted from the client device 50 is received by the platform server device 40 in step ST15. Next, in step ST16, it is determined whether the link notification is valid by using the nonce included in the link notification received in step ST15. More specifically, in the transfer data 43a, when the transfer status information corresponding to the nonce included in the link notification is set to "0" that indicates that the transfer process of the game data has been completed, the use of the nonce is the first time so that the link notification is determined as valid. Whereas, in the transfer data 43a, when the transfer status information corresponding to the nonce included in the link notification is set to "1" that indicates that the transfer process of the game data has been completed, the use of the nonce is not the first time so that the link notification is determined as invalid. The determination process in step ST16 is performed by, for example, the above-described determination unit 41b.

When the link notification is determined to be valid in step ST16, the transfer status information corresponding to the nonce in the transfer data 43a is updated in step ST17 to "1" indicating that the game data transfer process has been completed. In step ST18, a notification of transfer completion indicating that the game data transfer process has been completed is transmitted to the client device 20.

Subsequently, in step ST19, the client device 20 receives a notification of transfer completion.

In step ST20, the game is started on the client device 20 and the game progresses in accordance with operations of the user A. Since the client device 20 advances the game in cooperation with the game server device 60, the game is provided on the platform 1B. Further, by referring to the link data 103, the game can utilize the game data 101 accumulated in the platform 1A. Specifically, the client device 20 can utilize the game data 101 accumulated on the platform 1A while the game is being executed on the platform 1B in the following procedure. First, while executing the game on the platform 1B, the client device 20 or the game server device 60 transmits a request to retrieve game data to the storage 100. The retrieval request is transmitted to the storage 100 together with the user identification information (the second user ID) of the user A on the platform 1B. The storage 100 refers to the link data 103 and specifies the first user ID associated with the received second user ID. Next, data corresponding to the first user ID or a part of the data is extracted from the game data 101 of the platform 1A, and the extracted data is returned to the client device 20 or the game server device 60. More specifically, the game data 101 of the user A on the platform 1A is specified based on the second user ID of the user A and the link data 103, and the game progresses on the platform 1B using the data extracted from the game data 101 specified in this manner. In this way, the client device 20 and the game server device 60 can use the game data 101 accumulated in the platform 1A during the execution of the game on the platform 1B. In other words, the transfer of the game data accumulated in the platform 1A to the platform 1B is realized.

In the above embodiment, different user identification information is used between the platform 1A and the platform 1B. However, it is possible to transfer game data from one platform to another platform where different user identification information is used by referring to the link data 103 in which the first user ID used on the platform 1A is associated with the second user ID used on the platform 1B.

In the above embodiment, the identification code used for the transfer of the game data is generated on the transfer destination platform (the platform 1B). As a result, even when the transfer source platform (the platform 1A) is unable to generate a code used for the transfer, it is possible to transfer the game data using the identification code generated on the transfer destination platform.

In the above embodiment, the identification code used for transfer of the game data is generated on the transfer destination platform (the platform 1B). Therefore the operator of the platform 1B is able to utilize the identification code to promote switch to the platform 1B. For example, when an operator is going to stop the operation of the platform 1A, it is possible to encourage the existing users on the platform 1A to switch to the platform 1B.

In the above embodiment, the identification code may be an optically readable code. When the identification code is the optically readable code, it is easy to transmit/receive the identification code between the client devices used on different platforms.

In the above embodiment, the identification code includes a nonce, and the notification of completion (the link notification) indicating that the linking process has been completed is generated so as to include the nonce included in the received identification code. With the nonce, it is allowed to use the identification code only once. In this way, it is possible to prevent that game data is transferred to an invalid client by a replay attack.

In the above embodiment, an electronic signature is attached to the identification data, and when it is determined using a public key that the identification data is valid, the link data 103 is generated. In this way, it is possible to prevent unauthorized transfer of the game data using a tampered identification code.

Embodiments of the disclosure are not limited to the above embodiments but various modifications are possible within a spirit of the invention. For example, some or all of the functions executed by the processor 11, 21, 31, 41, 51, 61 may be realized by a processor which is not shown in the above-mentioned embodiment without departing from the scope of the invention. Although the processor 11, 21, 31, 41, 51, 61 is illustrated as a single component in FIG. 1, the processor 11, 21, 31, 41, 51, 61 may be a collection of a plurality of physically separate computer processors. In this specification, a program or instructions included in the program that are described as being executed by the processor 11, 21, 31, 41, 51, 61 may be executed by a single computer processor or distributed and executed by a plurality of processors. Further, a program or instructions included in the program executed by the processor 11, 21, 31, 41, 51, 61 may be executed by a plurality of virtual computer processors.

Even if the processes and the procedures described herein are executed by a single apparatus, software piece, component, or module, such processes and procedures may also be executed by a plurality of apparatuses, software pieces, components, and/or modules. Even if the data, tables, or databases described herein are stored in a single memory, such data, tables, or databases may also be dispersed and stored in a plurality of memories included in a single apparatus or in a plurality of memories dispersed and arranged in a plurality of apparatuses. The elements of the software and the hardware described herein can be integrated into fewer constituent elements or can be decomposed into more constituent elements.

The procedures described herein, particularly those described with a flowchart, are susceptible of omission of part of the steps constituting the procedure, adding steps not explicitly included in the steps constituting the procedure, and/or reordering the steps. The procedure subjected to such omission, addition, or reordering is also included in the scope of the invention unless departing from the true scope and spirit of the present invention.

What is claimed is:

1. A method comprising:
   storing first user identification information of a user on a first platform, the first platform able to provide a game;
   storing game data acquired by playing the game provided via the first platform with a first client device, the game data being stored in association with the first user identification information;
   storing second user identification information of the user on a second platform;
   generating an identification code by encoding identification data corresponding to the second user identification information;
   outputting the identification code to a second client device that provides the game the second platform;
   reading, with the first client device, the identification code output by the second client device;
   generating link data based on the identification code read from the second client device, the link data associating the first user identification information stored on the first platform with the second user identification information stored on the second platform; and
   providing the game to the user via the second platform, based at least in part on the game data acquired in the game provided via the first platform, the game data being identified based on the second user identification information stored on the second platform and the link data.

2. The method according to claim 1, wherein the identification code is an optically readable code.

3. The method according to claim 2, wherein outputting identification code to a second client device comprises:
   causing the identification code to be displayed on a display of the second client device.

4. The method according to claim 1, further comprising:
   transmitting a notification of completion to the second platform based on the first user identification information stored on the first platform being associated with the second user identification information stored on the second platform.

5. The method according to claim 4, further comprising:
   initiating the game on the second client device based on the notification of completion being received by the second platform.

6. The method according to claim 4, wherein:
   the identification code further includes a nonce, and
   the notification of completion is generated to include the nonce.

7. The method according to claim 1, wherein generating the identification code further comprises attaching an electronic signature to the encoded identification data, generating the link data comprises:
   determining, using a public key, that the encoded identification data is valid; and
   storing, based on the encoded identification data being determined to be valid, the first user identification information in association with the second user identification information.

8. The method according to claim 7, wherein generating the identification code comprises encoding the identification data with a secret key corresponding to the public key.

9. The method according to claim 1, wherein the identification code further includes expiration information indicating when the encoded identification code expires, generating the link data comprises:
   determining that the identification code is unexpired; and
   storing, based on the identification information being determined to be unexpired, the first user identification information in association with the second user identification information included in the identification code.

10. The method according to claim 1, wherein the identification code further includes an issuer name indicating an issuer of the identification code, generating the link data comprises:
    determining that the issuer name included in the identification code is valid; and
    storing, based on the issuer name being determined to be valid, the first user identification information in association with the second user identification information.

11. The method according to claim 1, wherein:
    the game data on the first platform is identified based on the second user identification information and the link data, and
    the game is provided to the second client device on the second platform using the game data.

12. The method according to claim 11, wherein:
    the identification code is generated on the second platform, and
    the link data is generated on the first platform.

13. The method according to claim 1, wherein:
    the first platform identifies the user by the first user identification information and does not identify the user by the second user identification information, and
    the second platform identifies the user by the second user identification information and does not identify the user by the first user identification information.

14. The method according to claim 1, wherein the game data comprises at least one of game progress in the game provided by the first platform, game items acquired in the game provided by the first platform, game status in the game provided by the first platform, game points acquired in the game provided by the first platform, and game currency acquired in the game provided by the first platform.

15. A computer-readable tangible non-transitory storage medium comprising a program including executable instructions that, when executed, cause one or more computer processors to perform operations comprising:
    storing first user identification information of a user on a first platform, the first platform able to provide a game;
    storing game data acquired by playing the game provide via the first platform with a first client device, the game data being stored in association with the first user identification information;
    storing second user identification information of the user on a second platform;
    generating an identification code by encoding identification data corresponding to the second user identification information;
    outputting the identification code to a second client device that provides the game via the second platform;
    reading, with the first client device, the identification code output by the second client device;
    generating link data based on the identification code read from the second client device, the link data associating the first user identification information stored on the first platform with the second user identification information stored on the second platform; and providing the game to the user via the second platform, based at least in part on the game data acquired in the game provided via the first platform, the game data being identified based on the second user identification information stored on the second platform and the link data.

16. A system comprising:

one or more processors; and one or more storages configured to store first user identification information of a user on a first platform, second user identification information of the user on a second platform, and game data of the user in association with the first user identification information, the game data being acquired by playing a game provided via the first platform with a first client device, the first user identification information being used to identify the user on the first platform, and the second user identification information being used to identify the user on the second platform, wherein the one or more processors execute computer readable instructions to:

generate an identification code by encoding identification data corresponding to the second user identification information to generate an identification code;

output the identification code to a second client device that provides the game via the second platform;

read, with the first client device, the identification code output by the second client device;

generate link data based on the identification code read from the second client device, the link data associating the first user identification information stored on the first platform with the second user identification information stored on the second platform;

and provide the game to the user via the second platform, based at least in part on the game data acquired in the game provided via the first platform, the game data being identified based on the second user identification information stored on the second platform and the link data.

* * * * *